United States Patent [19]

Yaron

[11] Patent Number: 5,117,231
[45] Date of Patent: May 26, 1992

[54] DOPPLER SPECTRUM SYNTHESIZER

[75] Inventor: John D. Yaron, Cockeysville, Md.

[73] Assignee: Westinghouse Electric Corp., Pittsburgh, Pa.

[21] Appl. No.: 411,131

[22] Filed: Sep. 22, 1989

[51] Int. Cl.⁵ ............................. G01S 7/40; G09B 9/40
[52] U.S. Cl. ..................... 342/195; 342/171; 434/2; 364/721
[58] Field of Search ............... 342/171, 169, 195, 89, 342/98, 99, 102, 103; 434/2; 364/721, 729

[56] References Cited

U.S. PATENT DOCUMENTS

| | | | |
|---|---|---|---|
| 3,374,481 | 3/1968 | Lupinetti | 342/169 |
| 3,719,812 | 3/1973 | Bishop et al. | 364/579 |
| 3,731,309 | 5/1973 | Meyer et al. | 342/168 |
| 3,832,712 | 8/1974 | Goetz et al. | 342/168 |
| 3,896,437 | 7/1975 | Morris | 342/168 |
| 3,906,500 | 9/1975 | Redman | 342/167 |
| 3,924,341 | 12/1975 | Edelsohn | 342/171 |
| 3,925,653 | 12/1975 | Otto | 364/827 |
| 3,975,732 | 8/1976 | Richards | 342/158 |
| 4,005,417 | 1/1977 | Collins | 342/192 |
| 4,134,072 | 1/1979 | Bolger | 328/14 |
| 4,204,342 | 5/1980 | Linfield | 342/169 X |
| 4,209,786 | 6/1980 | Barley et al. | 342/171 X |
| 4,319,245 | 3/1982 | Mawhinney | 342/104 |
| 4,389,648 | 6/1983 | Luscombe et al. | 342/104 |
| 4,393,444 | 7/1983 | Weinberg | 364/200 |
| 4,450,447 | 5/1984 | Zebker et al. | 342/171 |
| 4,484,265 | 11/1984 | Czekalski | 364/200 |
| 4,492,936 | 1/1985 | Albarello et al. | 332/128 |
| 4,560,987 | 12/1985 | Dochow et al. | 434/2 X |
| 4,580,277 | 4/1986 | Angello et al. | 375/67 |
| 4,591,858 | 5/1986 | Jacobson | 434/2 X |
| 4,626,217 | 12/1986 | Tardiff et al. | 434/8 |
| 4,633,198 | 12/1986 | Goetz et al. | 332/22 |
| 4,666,407 | 5/1987 | Jones | 434/2 |
| 4,737,792 | 4/1988 | Grone | 342/169 |
| 4,809,205 | 2/1989 | Freeman | 364/721 |

FOREIGN PATENT DOCUMENTS 54-18295 10/1979 Japan.
57-128864 8/1982 Japan.
58-200178 11/1983 Japan.

OTHER PUBLICATIONS

European Search Report conducted by Examiner Haffner R. D. R. at The Hague and completed Jun. 5, 1991.
Proceedings of the 42nd Annual Frequencies Control Symposium, Baltimore, Md., 1-3 Jun. 1988, pp. 357-363, IEEE, New York, H. T. Nicholas et al.
Electro/76 Professional Program, Boston, Mass., 11-14 May 1976, pp. 1-8, Los Angeles, R. H. Hosking.

*Primary Examiner*—John B. Sotomayor
*Attorney, Agent, or Firm*—N. A. Nixon

[57] ABSTRACT

A synthesizer combines frequencies for multiple targets, accumulating the phase components separately and allowing the targets to change velocity separately. The amplitude of the simulated signal at the phase secified is generated using a method that combines coarse and fine angle components of the desired angle signal allowing small high speed memories to be used. A first ROM is addressed by high order bits of the phase component and a second ROM by the lower order bits. The outputs of the first and second ROM's are multiplied and then added to the output of the first ROM producing the amplitude of the desired phase. The system also allows the amplitude of the signal being synthesized to be modulated by multiplying the synthesized digital value by an amplitude modulator. The synthesized amplitudes for each frequency are combined. Digital zero order hold correction removes amplitude distortion from the output spectrum. Separate target profiles for mulitple targets can be simulated in high detail as the radar simulates a target illumination sweep by a profile memory addressed by the filtered combination. By providing the angle components to in-phase and quadrature generators the system will simulate digital signals for digital radars. After the filtered value is converted into an analog echo signal, a programmable lowpass filter, with a passband adjustable based on the number of targets being simulated, adjusts the passband to suppress undesired components.

2 Claims, 8 Drawing Sheets

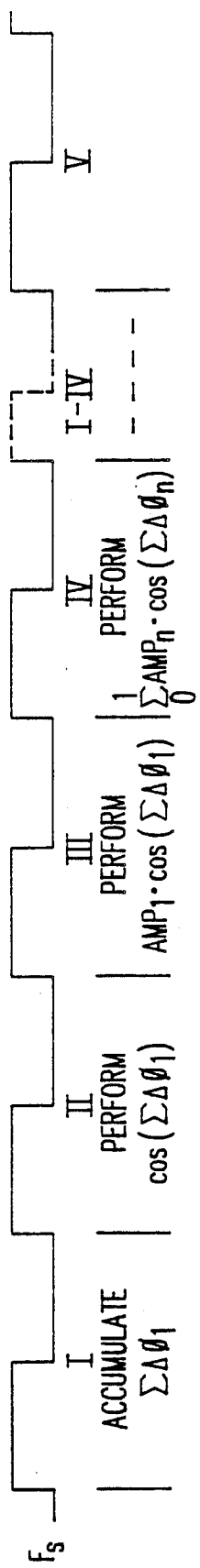
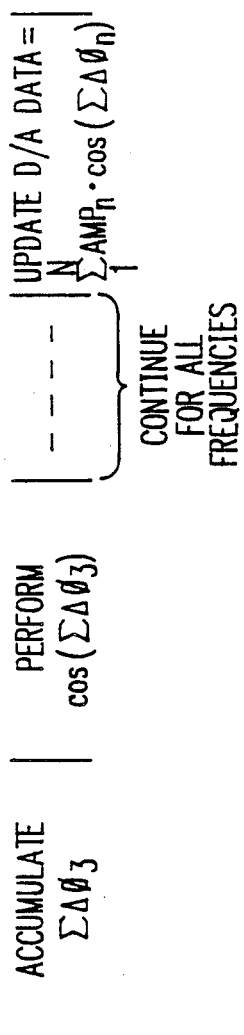
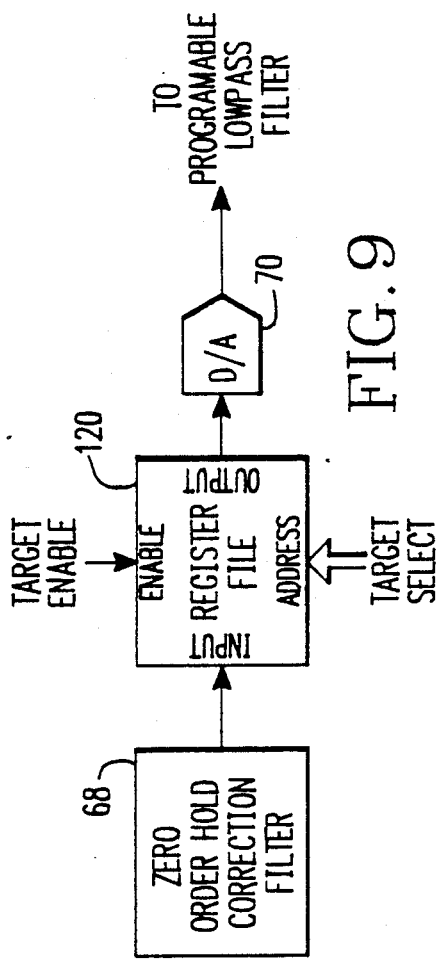
FIG. 8
FIG. 9

DOPPLER SPECTRUM SYNTHESIZER

BACKGROUND OF THE INVENTION

1. Field of the Invention

The present invention is directed to a spectrum synthesizer for use in testing a pulsed doppler radar and, more particularly, to a system which will generate multiple targets with amplitude and acceleration changes along with specific target profiles for both analog and digital radar inputs.

2. Description of the Related Art

When testing a pulsed doppler radar system, it is necessary to simulate dynamic doppler shifts in the radar's transmission frequency corresponding to the simulated target's velocity. The doppler shift fd is determined by the following equation:

$$fd = ((2 * v * ft)/c) * \cos a \quad (1)$$

where v is the relative velocity of the target, ft is the radar transmission frequency, c is the speed of light and a is the relative angle between the radar platform velocity vector and the target velocity vector. Equation (1) describes the frequency of the sinusoidal doppler superimposed on the radar's received information.

Conventional target simulators generate the doppler shift by using a sinusoidal lookup table 14 to produce a digital representation of the amplitude of the doppler shifted signal and a digital-to-analog converter 16 to convert the digital value into an analog radar signal as illustrated in FIG. 1. During operation an accumulator 10 accumulates the desired phase of the frequency at a rate fs where the outputs of the accumulator represent the on going phase value or angle of the signal being simulated. That is, the register 12 contains a value (an increment) which represents how much the phase of the signal will change within a period equal to 1/fs. The accumulator 10 sums the phase increments. The phase value is applied to a sinusoidal lookup table, conventionally a read only memory (ROM) storing signal values for each phase value with the phase value acting as the address of the signal value in the ROM. As a result, when the phase value is applied as an address to the ROM, the ROM produces a digital sample of the amplitude of the signal being simulated. This digital amplitude sample is applied to the digital-to-analog converter 16 which produces the corresponding analog signal. As the sine lookup table 14 is addressed by different phase values the digital-to-analog converter 16 produces a stepped or discrete version of the signal being simulated (see FIG. 3a). A low pass filter 18 then smooths this signal producing an analog output suitable for input to the radar being tested.

FIG. 2a illustrates the ideal frequency spectrum at the output of the converter 16 where the desired output is a frequency spike 20 at the desired frequency fo. However, sampling components 22 and 24 are present in the actual output of the converter 16 due to the zero order holding nature of the converter 16. As previously mentioned these components are suppressed by the low pass smoothing filter 18 which has a transfer function 26 as illustrated in FIG. 2b. The final spectrum output by the low pass filter 18 as illustrated in FIG. 2c includes suppressed sampling components that are generally not detectable by the radar.

As mentioned above, as the lookup table 14 is addressed by new values the digital-to-analog converter 16 produces a stepped representation of the simulated signal as illustrated in FIG. 3a. If the desired frequency is doubled then every other location of the lookup table 14 is accessed at twice the original access frequency, thereby doubling the frequency and increasing the size of the steps between each output as shown in FIG. 3b. By using this method the prior art systems are capable of producing smooth frequency changes with no phase discontinuity because the frequency word update is accumulated with the previous sine table lookup value. These conventional systems have been modified to include the capability of frequency shift keying, phase shift keying and on/off keying as typified by U.S. Pat. No. 4,134,072. To provide for operation at today's operating frequencies and to provide an accuracy of at least 16 bits which is necessary to simulate signals at the resolution of today's doppler radars, a 24 bit addressable ROM lookup table is necessary requiring at least one megabyte of addressable storage. This read only memory must also be a high speed memory capable of being addressed at speeds of typically 100 nanoseconds for 3 megahertz bandwidth synthesizers. Such memories are very expensive.

SUMMARY OF THE INVENTION

It is an object of the present invention to provide a doppler radar spectrum synthesizer with increased resolution.

It is another object of the present invention to provide a synthesizer with increased speed of operation and thereby higher operating frequency capability.

It is an additional object of the present invention to provide for multiple target simulation.

It is also an object of the present invention to provide a synthesizer which does not require a high speed large capacity memory.

It is a further object of the present invention to provide a simulator which will allow target profiles to be simulated.

It is an additional object of the present invention to provide a synthesizer with increased bandwidth.

It is another object of the present invention to provide a synthesizer which has amplitude scaling capability allowing rotation and distance changes of a target to be simulated.

It is an object of the prevent invention to provide a simulator with in-phase and quadrature phase components for input to a digital radar.

It is also an object of the present invention to provide spectrum correction without step response overshoot.

The above objects can be attained by a synthesizer which combines frequencies for multiple targets, accumulating the address components separately allowing the targets to change velocity separately. The simulated signal is generated using a method that generates and combines components of the desired phase or angle signal allowing small high speed memories to be used. The system also allows the amplitude of the signal being synthesized to be modulated by multiplying the synthesized digital value by a desired amplitude. Digital zero order hold correction removes step response overshoot producing a smoother simulated signal. By providing separate target profiles, multiple targets can be simulated in high detail as the radar generates a target illumination sweep. By providing the angle components to in-phase and quadrature phase generators the system will simulate digital signals for a digital radar.

These together with other objects and advantages which will be subsequently apparent, reside in the details of the construction and operation as more fully hereinafter described and claimed, reference being had to the accompanying drawings forming a part hereof, wherein like numerals refer to like parts throughout.

BRIEF DESCRIPTION OF THE DRAWINGS

FIG. 8 illustrates the pipeline operation of the present invention;

FIG. 9 shows a modification of the device of FIG. 4 which allows target profile simulation;

DESCRIPTION OF THE PREFERRED EMBODIMENTS

Figure 1:
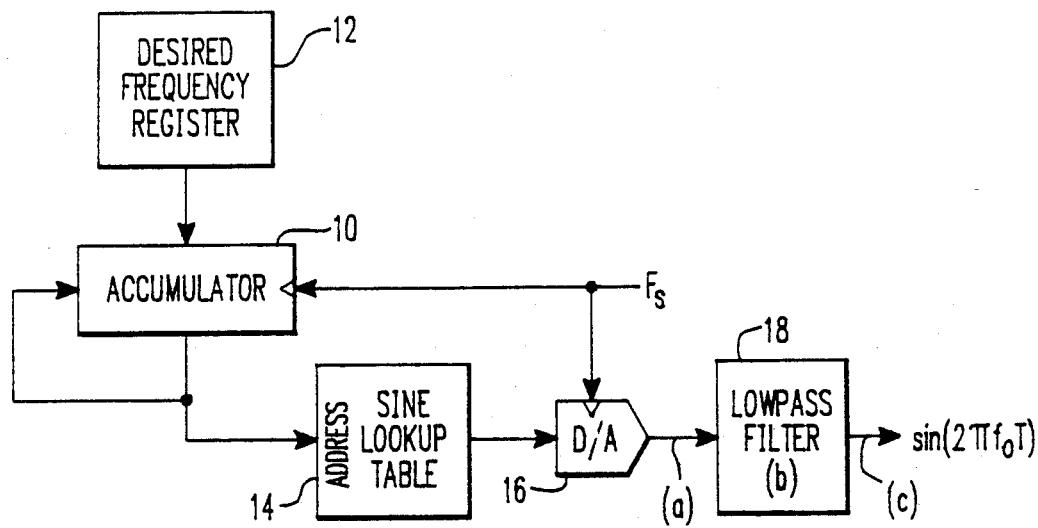
FIG. 1 shows the components of a prior art simulator.
Figure 2A:
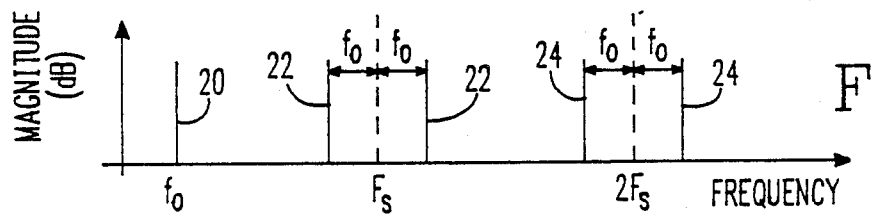
FIG. 2a illustrates the spectrum output by converter 16 of FIG. 1.
Figure 2B:
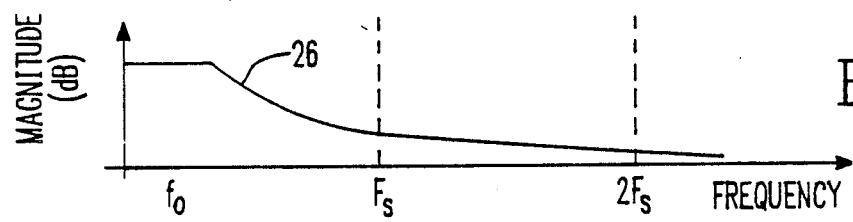
FIG. 2b illustrates the transfer function of the filter 18 of FIG. 1.
Figure 2C:
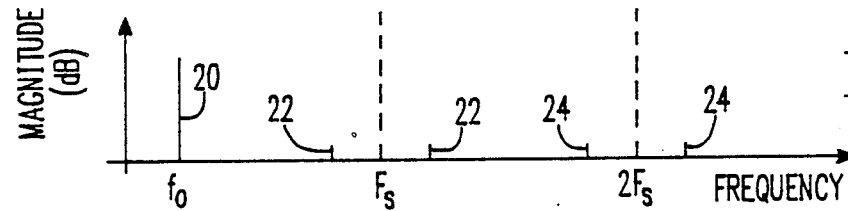
FIG. 2c illustrates the spectrum output by filter 18.
Figure 3A:
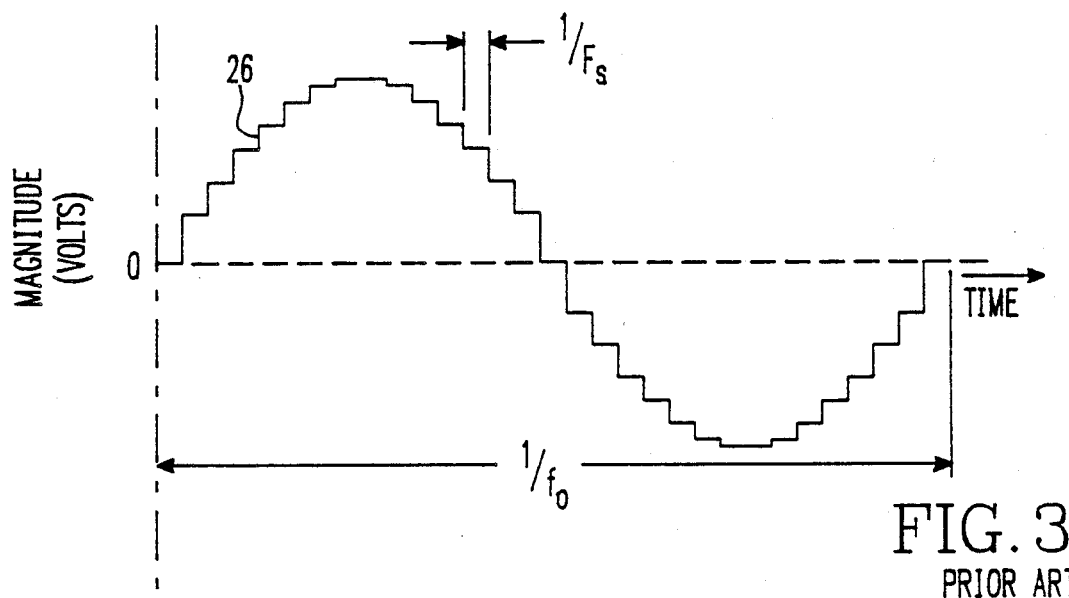
FIG. 3a depicts the stepped output of the converter 16 of FIG. 1.
Figure 3B:
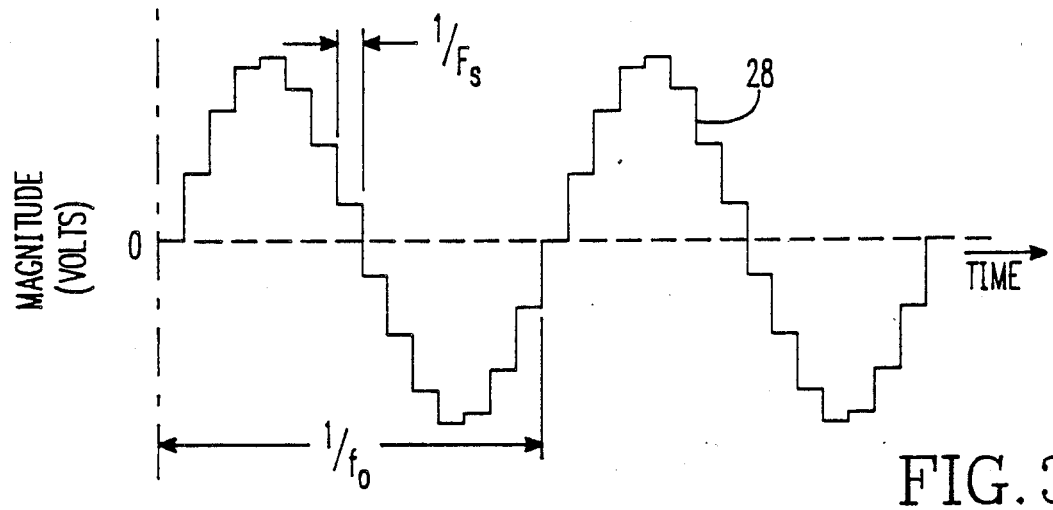
FIG. 3b shows the output of converter 16 when the output frequency of table 14 is doubled.

During operation, the cycles of the present invention, as discussed in more detail below, are controlled by a cycle control unit 40 which can be a conventional ring counter with an appropriate conventional output decoder for clocking the components in the order as discussed below. The present invention accumulates phase change (delta) values for the signals being simulated. The delta phase change values depend on the frequency of the signal being simulated and the output clock of the synthesizer. For example, if the doppler signal being simulated is a 50 kilohertz signal and the sample clock operates at 20 megahertz the delta phase equals 0.9°. The operation begins with the accumulation of the first delta phase value from delta phase Random Access Memory (RAM) 44 with the accumulation register RAM 42 output for the accumulated first frequency phase value. That is, delta phase RAM 44 will hold n delta phase values or increments allowing n targets or frequencies to be simulated. The phase accumulation RAM 42 stores the accumulated delta phase values for each one of the individual frequencies being simulated similar to the manner in which the accumulator 10 in FIG. 1 accumulates a single frequency phase value.

Figure 5A:
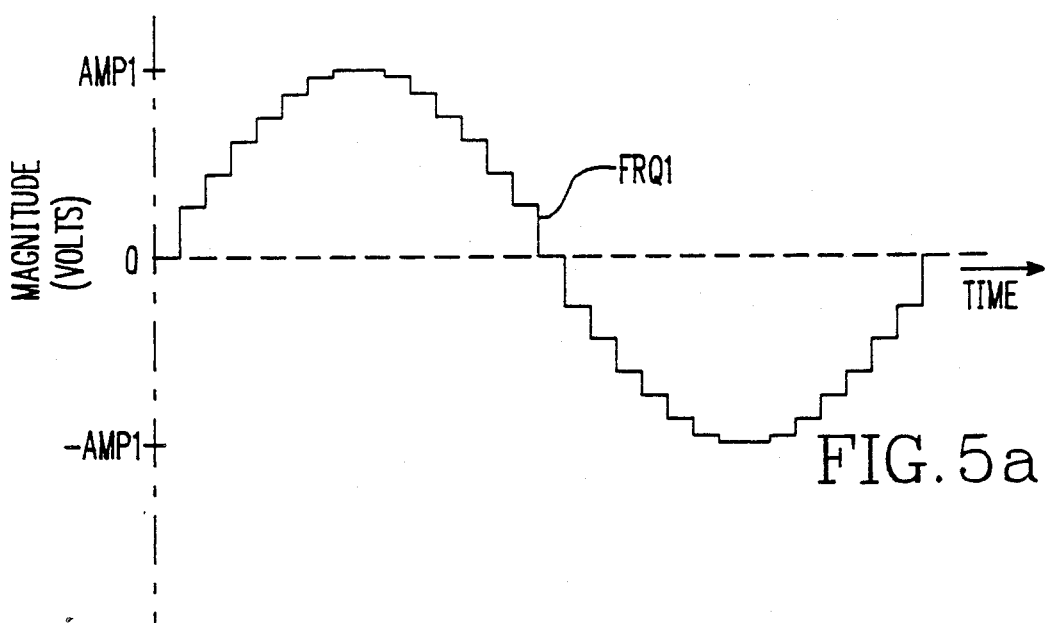
FIGS. 5a-5c illustrate the combination of first (FRQ1) and second (FRQ2) frequency signals by the device of FIG. 4.
Figure 5B:
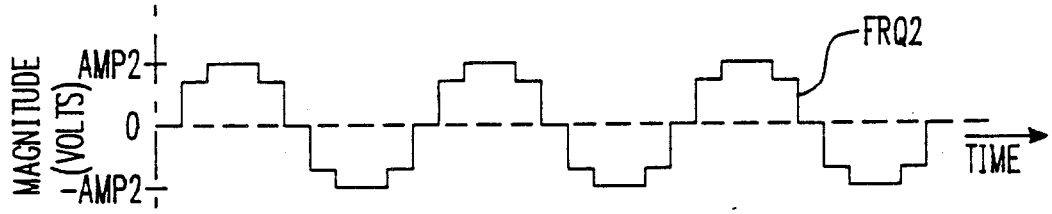
Figure 5C:
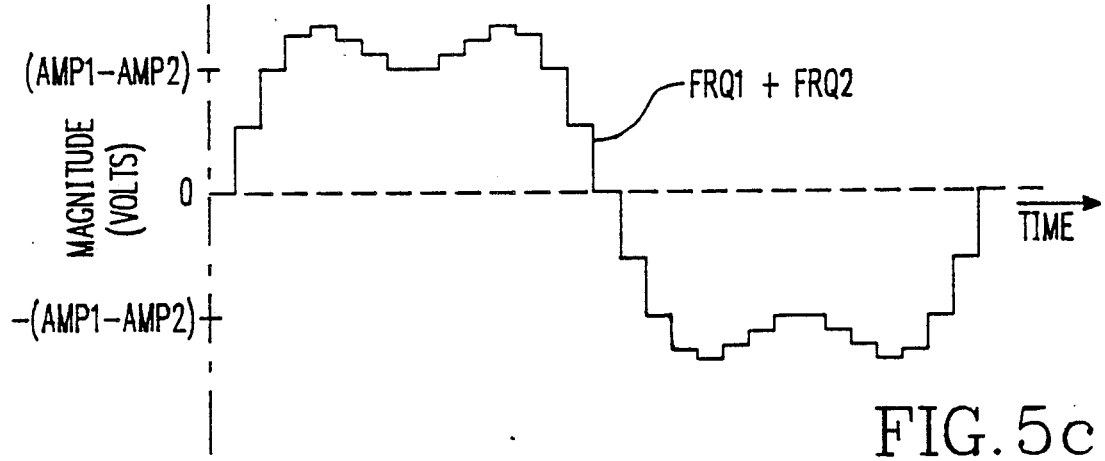

During the first cycle of a computation sequence, the first frequency delta phase value is read from RAM 44 and latched into the latch 46 while the first frequency accumulated phase value is read from RAM 42 and latched in latch 48. In the next cycle, adder 50 adds the first delta phase value from latch 46 to the first accumulated phase value in latch 48 and stores the result in latch 52. During the next cycle the accumulated value ($\Sigma\Delta\phi_1$) in latch 52 is written back to the phase accumulaton RAM 42 through buffer 54 while simultaneously being applied to the cosine generator 56. In the next cycle the cosine generator 56 produces an angle amplitude component (cos ($\Sigma\Delta\phi_1$)) for the first frequency being simulated corresponding to the cosine of the accumulated phase value and applies this value to a multiplier 58. An amplitude value output from amplitude RAM 60 is stored in amplitude latch 62 and is used by multiplier 58 to produce a scaled or multiplied value ($AMP_1$ cos ($\Sigma\Delta\phi_1$)) corresponding to the first frequency. This discrete time amplitude value is combined with an accumulated amplitude value stored in latch 64, which has been previously set to zero at the start of the cycle, by adder 66 to produce a result $\Sigma AMP_1 cos(\Sigma\Delta\phi_1)$ for the first frequency. The components 42-66 cycle again using the second frequency delta phase increment from RAM 44, the second accumulated frequency phase value from RAM 42 and the second amplitude from RAM 60. At the end of these two cycles the latch 64 contains the sum of the discrete time amplitudes for frequencies 1 and 2. This operation continues for as many frequency components as are specified (n) ending the computation sequence. At the completion of the computation sequence, latch 64 is cleared and the entire cycle begins again. Simultaneously, the output is provided to zero order hold digital correction filter 68 which supplies an updated discrete time amplitude value to conventional converter 70. This value is a combination of the frequencies and, in the previous example, a combination of the first (FIG. 5a) and second (FIG. 5b) frequencies as illustrated in FIG. 5c. The output of the converter 70 is applied to a conventional programmable low pass filter 72 which, based on the input cut-off frequency, will produce a variable bandwidth multiple target synthesized signal.

Figure 4:
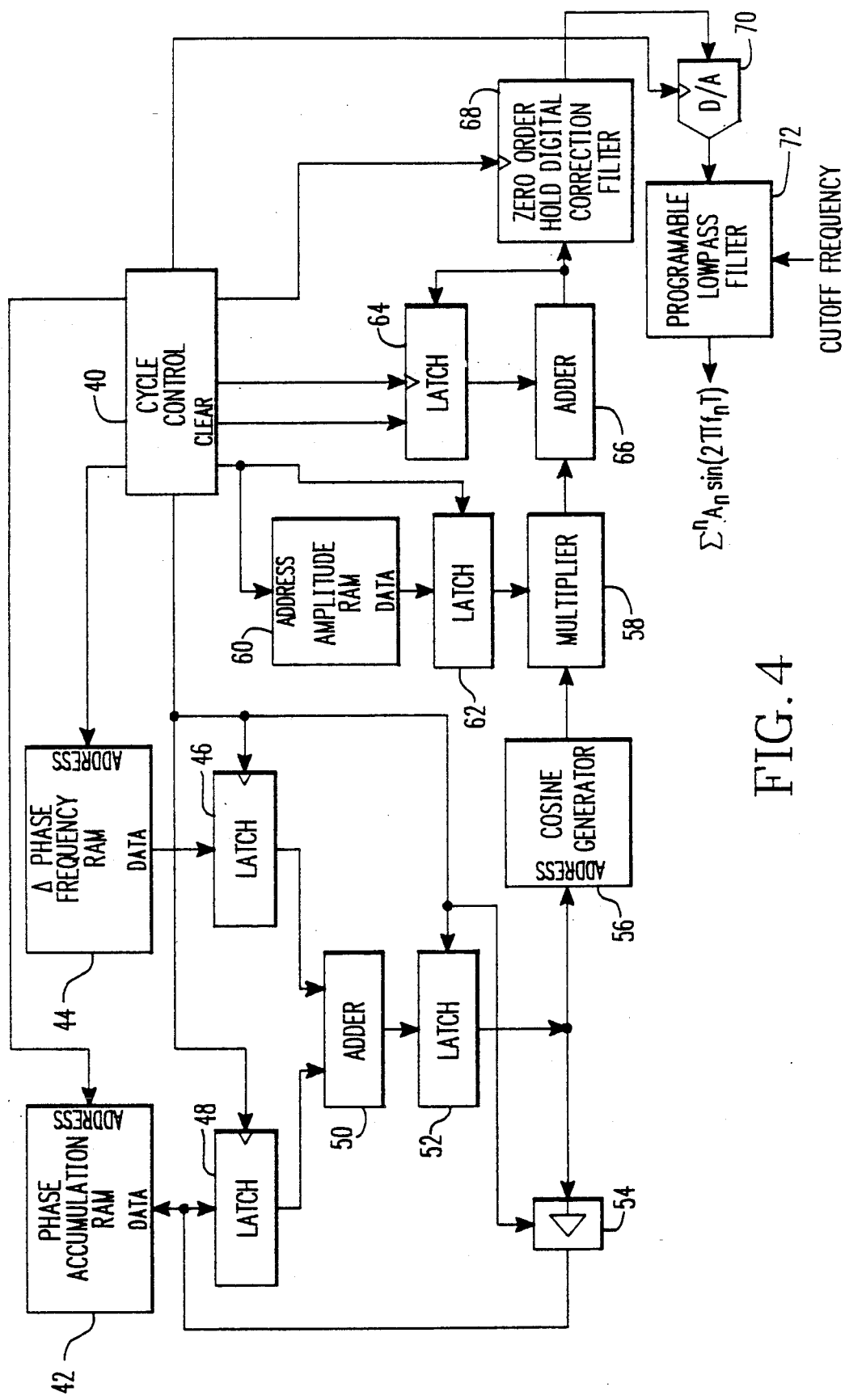
FIG. 4 illustrates the components of the present invention in a first embodiment.

During the operation of the device of FIG. 4, the synthesizer is performing an operation as described by equation (2) where da is the discrete time amplitude value, amplitude(n) is the amplitude value of the frequency component n and zn is the accumulated phase value for frequency n.

$$da = \sum_{i=1}^{n} amplitude(n) * cos(zn) \qquad (2)$$

Figure 6:
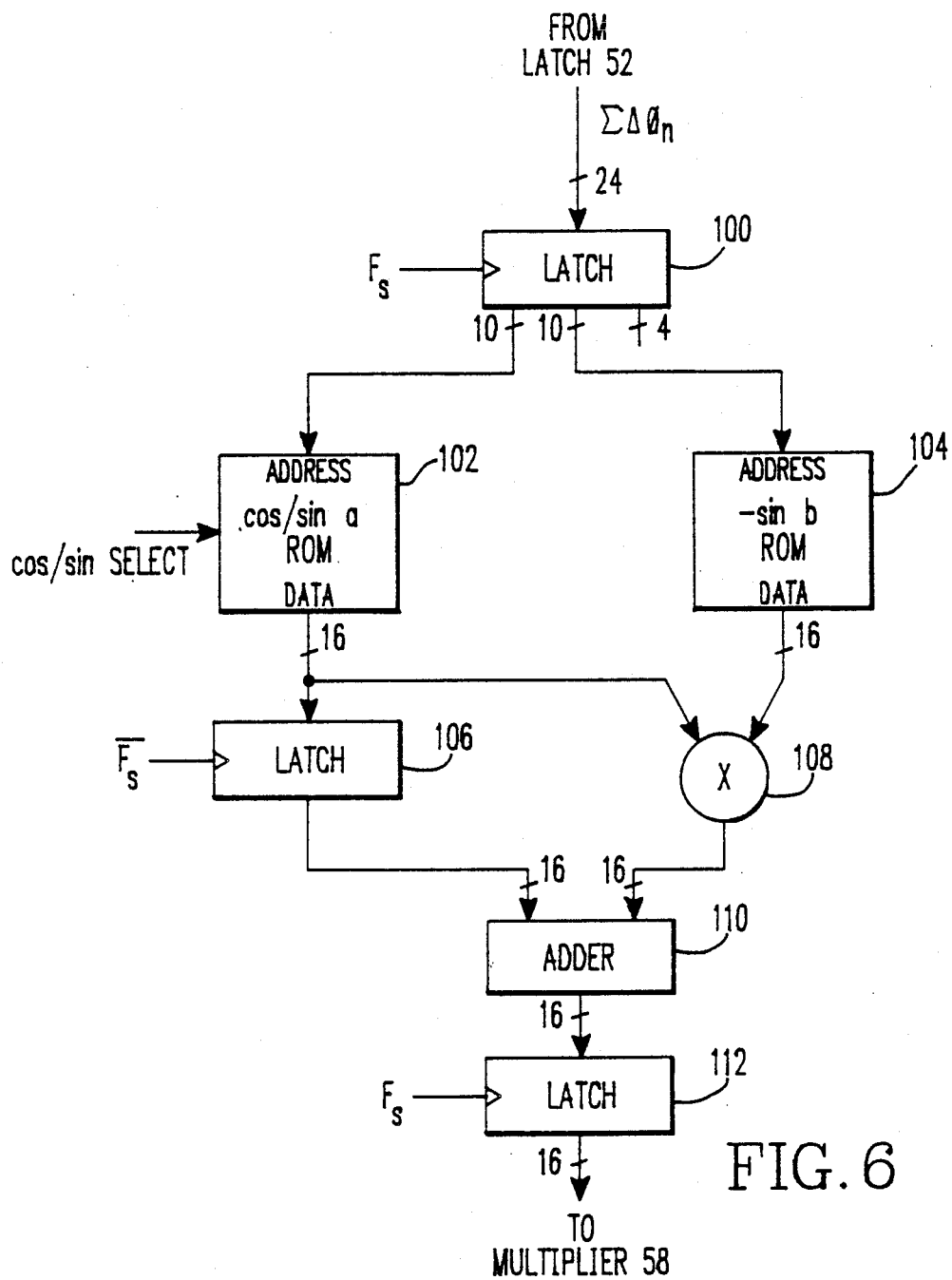
FIG. 6 illustrates the components of the generator 56 of FIG. 4.

The cosine generator 56 of FIG. 4 is illustrated in more detail in FIG. 6. To achieve low phase noise and low harmonic distortion of the cosine waves generated by the synthesizer, a high resolution cosine wave generator 56 is utilized which, through a calculation, emulates a high capacity high resolution cosine table ROM. The calculation method of the present invention is based on the fundamental mathematical principle of equation (3):

$$\cos(c) = \cos(a+b) = \cos a * \cos b - \sin a * \sin b \qquad (3)$$

Figure 7:
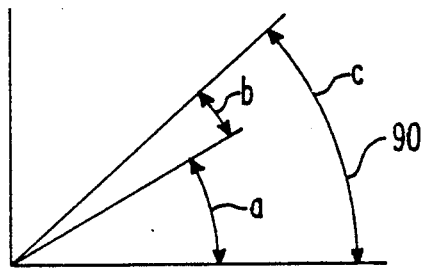
FIG. 7 illustrates the operation of the coarse and fine angle combination produced by generator 56.

Essentially this formula divides the angle c of interest into the sum of a coarse angle a and a fine angle b, as illustrated in FIG. 7. This is accomplished by splitting the binary word for the angle 90 and applying these values to two table look up ROMs which can be two high speed ROM's with a storage capacity of 1K and 2K words each. The generator 56 includes a latch 100 which stores a 24 bit phase value $\Sigma\Delta\phi_n$ for the angle c. The high order 10 bits for the coarse portion of the angle are applied to ROM 102 which stores values for the cosine of the angle a and the sine of the angle a. The next 10 most significant bits (or fine angle bits for angle b) are applied to a ROM 104 containing values for minus the sine of angle b. This ROM 104 does not require cosine values for the angle b because b is a small angle and it is possible to approximate the cosine of b as 1 for all values of b. That is:

$$bq = \text{quantized value of } b = 360°/2^{20} = 3.43 \times 10^{-4o} \quad (4)$$

$$bmax = \text{largest value of } b = bq\,(2^{20}-1) = 0.351° \quad (5)$$

and therefore the quantized value of the cosine of the maximum value for b is $$\cos(bmax) = (2^{15}-1) * \cos(bmax) = 2^{15}-1 \quad (6)$$

so that equation (3) can be simplified when using 16 bit integer arithmetic to:

$$\cos(a+b) = \cos a - \sin a * \sin b \quad (7)$$

Operation of the unit of FIG. 4 is preferably pipelined operating at a throughput rate of Fs. Within the pipeline of FIG. 4 is a subpipeline which performs the operations of FIG. 6. During the first cycle of the subpipeline cos a is accessed from ROM 102 and stored in latch 106. During the second cycle of the subpipeline, sin a is obtained from ROM 102 and −sin b is out ROM 104, multiplier 108 performs −sin a sin 110 performs cos a −sin a sin b, which is equivalent to equation (7), and this result is latched into latch 112. The pipeline operation of the present invention to obtain high speed operation is illustrated in FIG. 8. The operation of subpipeline of the generator 56 occurs in II–IV of FIG. 8.

FIG. 9 illustrates a modification of the embodiment of FIG. 4 which will allow multiple target profiles to be simulated. In this embodiment a register file 120 of high speed registers or a high speed RAM which stores separate target profiles in each file of registers or row/column of the RAM 120 is connected between the filter 68 and converter 70. When a target selection address is based on the angle of the radar antenna, the file 120 allows the simulated output for the illuminated target to be output by converter 70. The registers store the combination of summed frequencies. For example, one register could store:

$$\sum_{n=1}^{4} fn \quad (8)$$

, the sum of frequencies 1–4, another register could store:

$$\sum_{n=5}^{7} fn \quad (9)$$

and still another register:

$$\sum_{n=8}^{11} fn \quad (10)$$

In this way all the frequencies are constantly being generated but subdivided profiles are output by the unit 120 when that particular target is "seen" by the radar.

Figure 10:
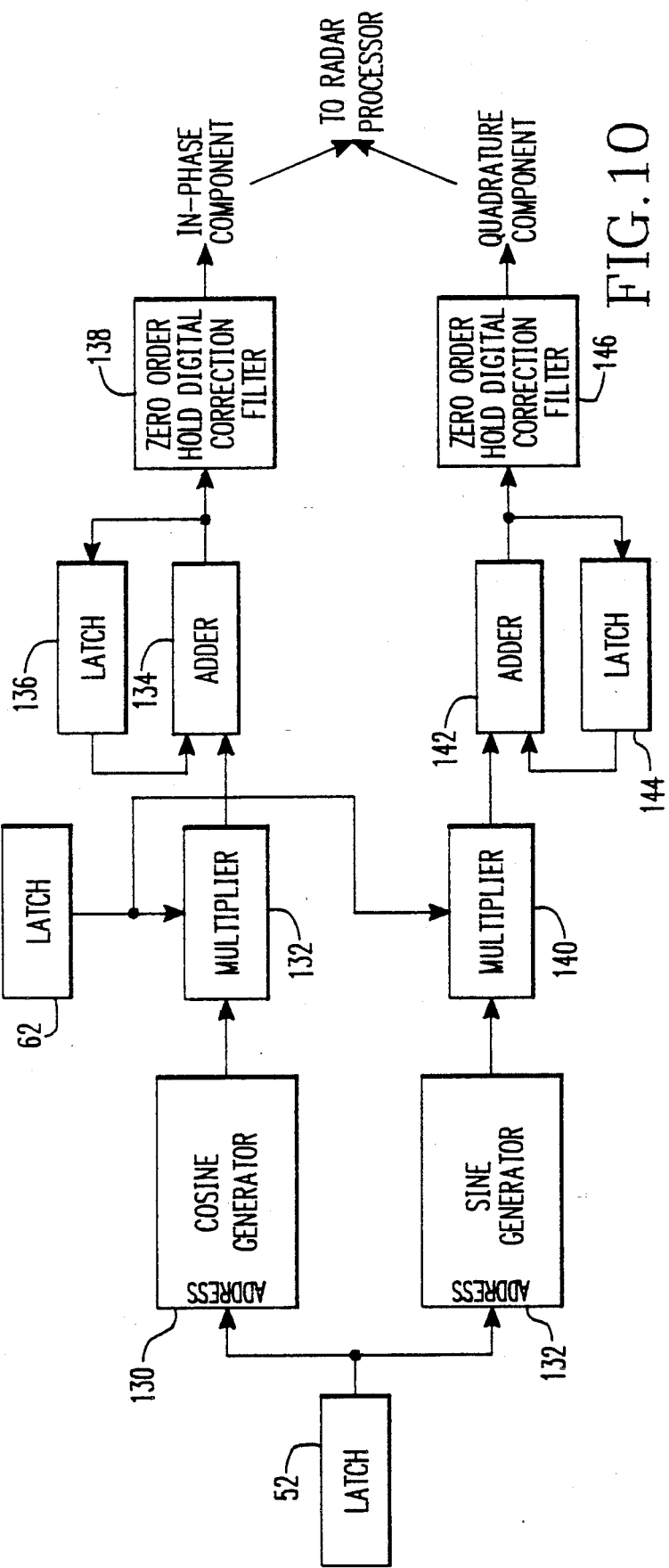
FIG. 10 illustrates an embodiment modification for producing digital radar outputs.

To provide a synthesizer capable of producing in-phase and quadrature phase components for a digital radar processor, the components illustrated in FIG. 10 can be substituted for the components 56, 58, 64, 66 and 68 of the embodiment of FIG. 4. In this embodiment an in-phase generator 130 generates the cosine component which is multiplied by the amplitude from latch 62 by multiplier 132, accumulated by adder 134 and latch 136, and corrected by filter 138 in a manner similar to that previously described. A corresponding quadrature generator 132 produces the sine component which is multiplied by multiplier 140, accumulated by adder 142 and latch 144, and corrected by filter 146. As a result the synthesizer of FIG. 10 will generate digital data representing dynamic target dopplers.

Figure 11A:
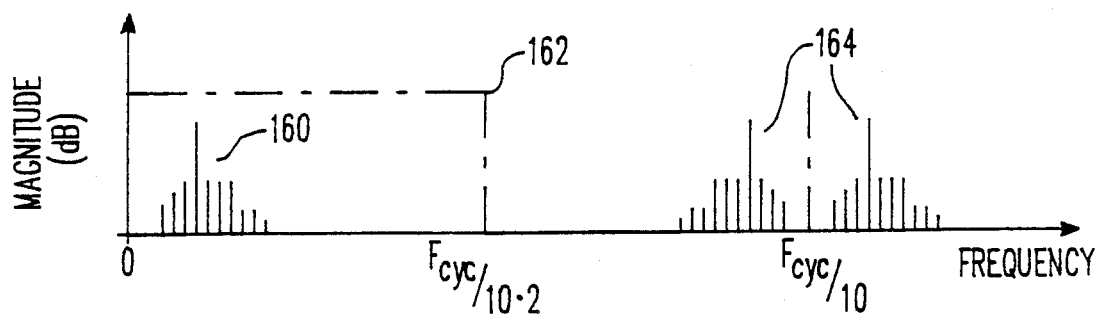
FIGS. 11a and 11b illustrate the operation of the programmable filter 72.
Figure 11B:
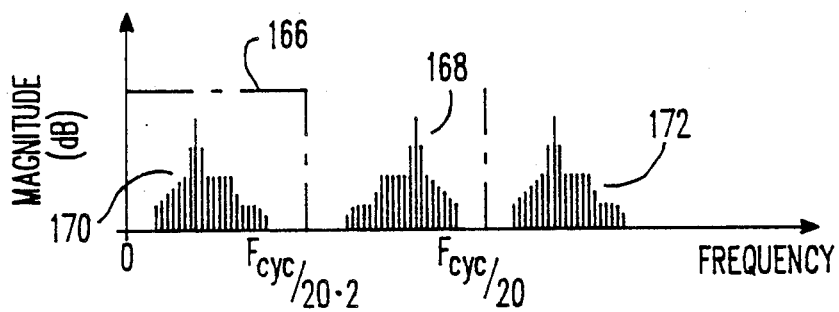

The bandwidth required by the simulator of the present invention is dependent on the number of frequencies being synthesized. Consider the cases where 10 and 20 frequency components are being simulated. The digital-to-analog update rate for 10 frequency components is Fcyc/10, where Fcyc is the accumulation rate for the synthesizer. Due to sampling effects, there exists a maximum frequency which can be specified for the RAM 44 without exhibiting aliasing. Ideally the bandwidth 162 of the synthesizer is Fcyc/(10*2) as ilustrated in FIG. 11a. This situation produces a desired spectrum 160 inside the ideal bandwidth 162 and sampling components 164 outside the bandwidth. In the case of 20 frequency components the ideal bandwidth 166 has fallen to Fcyc/(20*2), as illustrated in FIG. 11b. If the new bandwidth is maintained, when 20 frequency components were being simulated, the same as the bandwidth 162 when 10 frequency components are simulated, sampling components 168 of the desired spectrum 170 will fall within the bandwidth 162. Other spectrum components 172 will fall outside the bandwidth 162. As a result it is necessary to provide a programmable cut-off frequency for the low pass filter 72 where the cutoff frequency tracks the number of frequency components being synthesized as discussed above.

Figure 13:
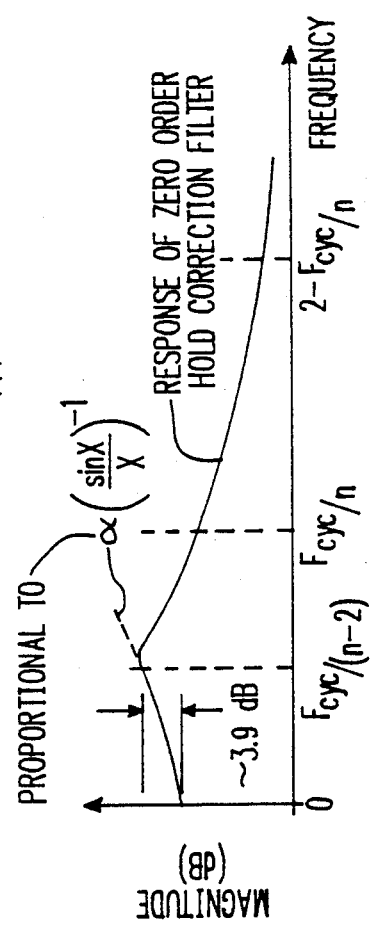
FIG. 13 illustrates the amplitude correction performed by filter 68.
Figure 12A:
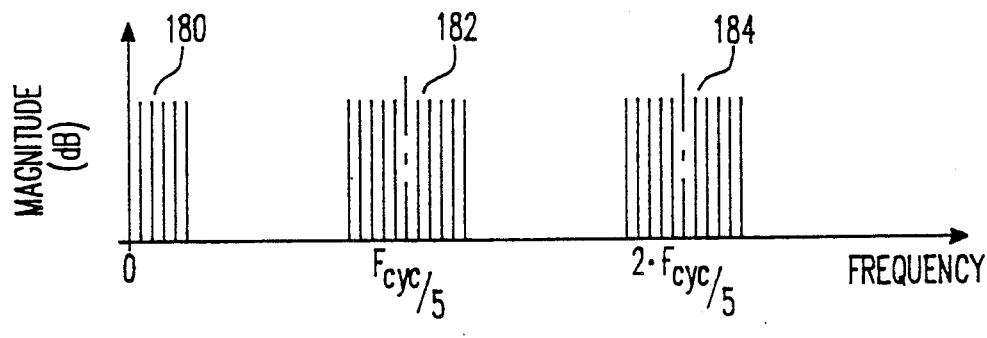
FIGS. 12a and 12b illustrate the effects of converter 70 on the amplitude.
Figure 12B:
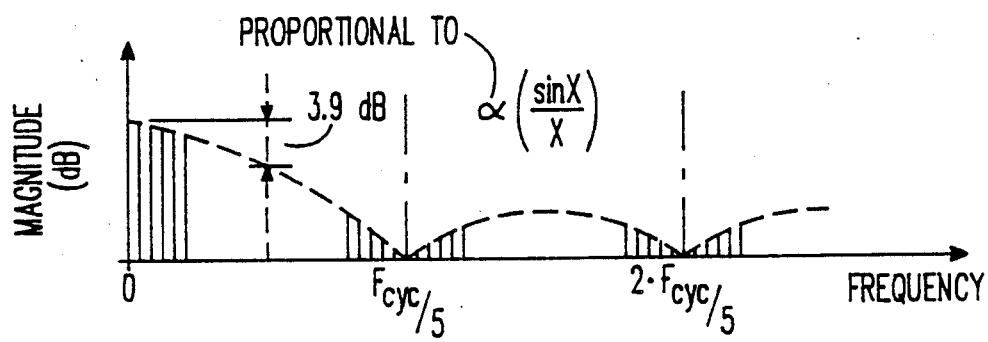

The amplitudes of the spectral components specified by the amplitude RAM 60 are slightly altered when converted by the convertor 70. FIG. 12a illustrates an ideal sample spectrum in which five frequency components of equal amplitude are generated. However, the actual attenuation of the spectrum caused by converter 70 follows a sin x/x distribution, as illustrated in FIG. 12b. At Fcyc/(n*2), the attenuation of the spectral components is approximately 3.9 db. The zero order correction filter 68 is provided to change the spectra using a $(\sin x/x)^{-1}$ transfer function. The generation of this frequency amplitude correction is performed by a second order lowpass filter with under damping. This filter exhibits a sloping passband which approximates the $(\sin x/x)^{-1}$ function as illustrated in FIG. 13. It is possible to use an analog device to perform this function, however, it is preferred that a conventional digital filter be used so that the under damping effects of an analog filter will be nulled.

The many features and advantages of the present invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A synthesizer for synthesizing a doppler radar echo signal, said synthesizer comprising:
   a first memory for storing n phase increments of n frequency signals to be synthesized;
   a second memory for storing n accumulated phase increments;
   a first adder, connected to said first and second memories, for adding corresponding phase increments and accumulated phase increments producing a phase value divided into high order and lower order segments;
   a third memory connected to said first adder and storing first amplitude components addressed by the high order segment;
   a fourth memory connected to said first adder and storing second amplitude components addressed by the lower order segment;
   a multiplier connected to said third and fourth memories, and multiplying a first one of the first amplitude components and one of the second amplitude components;
   a second adder connected to said multiplier and said third memory, and adding the first amplitude to the multiplied first and second amplitude components producing an amplitude value;
   an accumulator connected to said second adder and accumulating the amplitude values; and
   a converter for converting the accumulated amplitude values into the doppler radar echo signal.

2. A synthesizer for synthesizing a doppler radar echo signal, said synthesizer comprising:
   a first memory for storing n phase increments of n frequency signals to be synthesized;
   a second memory for storing n accumulated phase increments;
   a first adder, connected to said first and second memories, for adding corresponding phase increments and accumulated phase increments producing a phase value divided into high order and lower order segments;
   a third memory connected to said first adder and storing first amplitude components addressed by the high order segment;
   a fourth memory connected to said first adder and storing second amplitude components addressed by the lower order segment;
   a first multiplier connected to said third and fourth memories, and multiplying a first one of the first amplitude components and one of the second amplitude angle components;
   a second adder connected to sa&d first multiplier and said third memory, and adding a second one of the first amplitude components to the multiplied first and second amplitude components producing an amplitude value;
   a second multiplier connected to said second adder and multiplying the amplitude value by an amplitude multiplier;
   an accumulator connected to said second multiplier and accumulating an amplitude multiplied value;
   a zero order correction filter connected to said accumulator and correcting the amplitude multiplied value;
   a target profile memory connected to said filter and producing a target profile value responsive to the target selected;
   a converter converting the profile value into a signal; and
   a programmable lowpass filter connected to said converter, providing a lowpass bandwidth responsive to a value of n and providing the doppler radar echo signal.

* * * * *